UNITED STATES PATENT OFFICE.

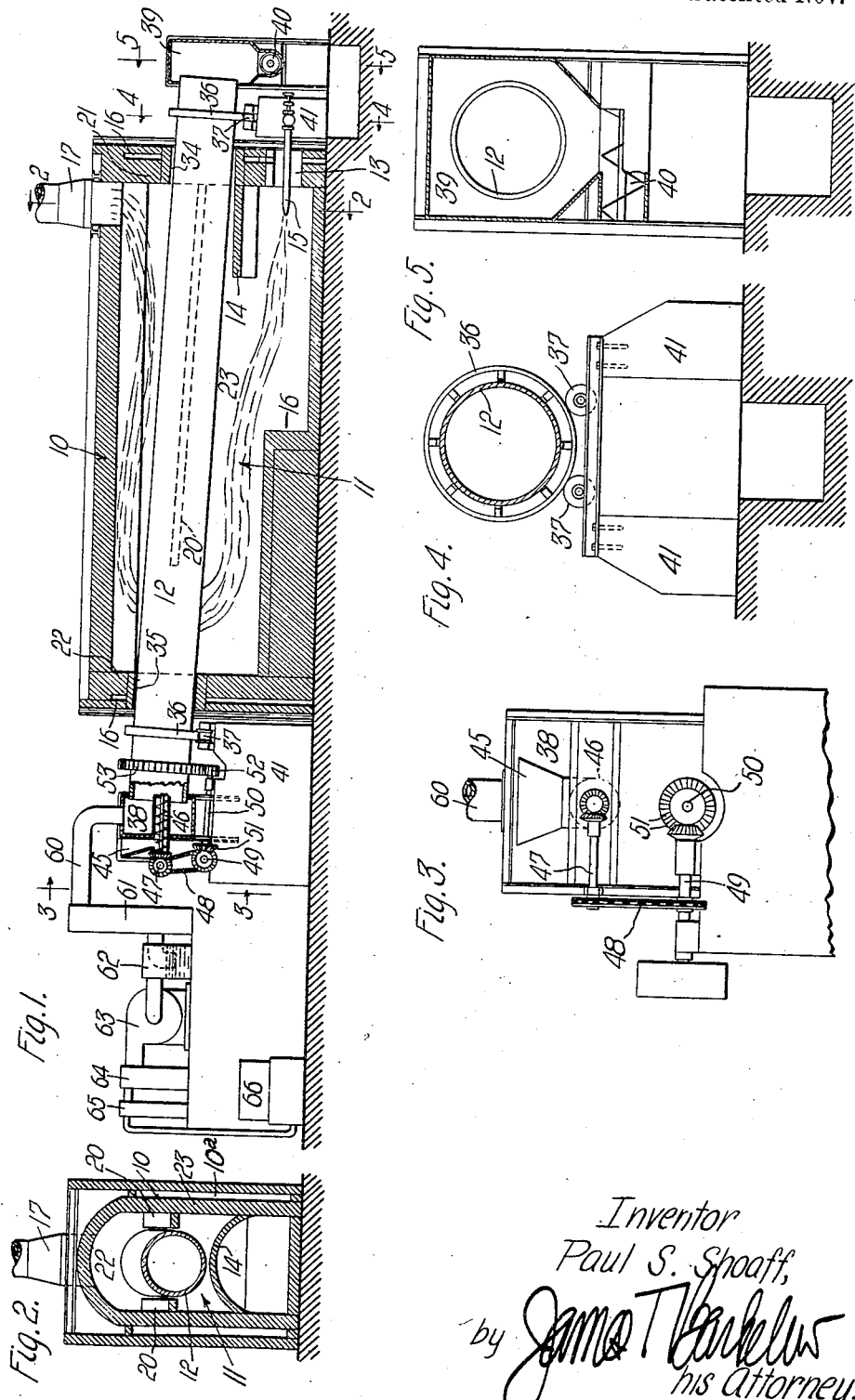

PAUL S. SHOAFF, OF LONG BEACH, CALIFORNIA.

CONTINUOUS ROTARY RETORT.

1,284,479.  Specification of Letters Patent.  Patented Nov. 12, 1918.

Application filed September 21, 1916. Serial No. 121,400.

*To all whom it may concern:*

Be it known that I, PAUL S. SHOAFF, a citizen of the United States, residing at Long Beach, in the county of Los Angeles, State of California, have invented new and useful Improvements in Continuous Rotary Retorts, of which the following is a specification.

This invention relates to apparatus for the destructive distillation of kelp or similar organic matter, or for heat-treating any matter which may be treated in the manner hereinafter specified; and it is a primary object of this invention to provide a simple, effective and durable form of apparatus for continuously carrying on such treatment. I describe my invention as applied to the treatment of kelp, or the like, describing a specific form of apparatus particularly adapted for this particular purpose.

After kelp has been wholly or partially dried, it is often desirable to convert it into a char which becomes a carrier for the potash and other salts, useful as a fertilizer, or capable of being subjected to further refining processes for the production of potassium and other salts and various by-products. If the dried or partially dried kelp is burned in the presence of any appreciable or considerable quantity of air an inferior product results; fusion and clinkering of the saline constituents taking place. Such a method is, moreover, generally costly and wasteful.

In my apparatus herein described, I provide means for continuously subjecting the material—the kelp—to the action of heat at a uniform temperature, in the comparative absence of air (that is, the air being sufficiently excluded so that the small amount present does not cause any injurious results). By such treatment I obtain a char free from volatile organic matter, containing no clinkers, but containing the valuable mineral constituents in such form as to be easily available as fertilizer or for subsequent separation and refinement. Furthermore, in this apparatus, the volatilized matter may be recovered and utilized.

In the following specification I explain a preferred form of device, particularly adapted for treating kelp and the like; and I illustrate said device in the accompanying drawings, in which, Figure 1 is a longitudinal section and side elevation of the rotary retort or incinerator, showing the accompanying apparatus diagrammatically; Fig. 2 is a section taken as indicated by line 2—2 on Fig. 1; Fig. 3 is an enlarged end elevation taken as indicated by line 3—3 on Fig. 1; Fig. 4 is an enlarged section taken as indicated by line 4—4 on Fig. 1; and Fig. 5 is an enlarged section taken as indicated by line 5—5 on Fig. 1.

In the drawings I illustrate a furnace structure 10 inclosing a furnace chamber 11 of suitable size and shape to contain and surround an elongated retort, or incinerator tube 12 placed in an inclined position as illustrated. A burner of any character (for instance, one utilizing liquid fuel) is inserted at 15 through the furnace door 13 and an arch 14 protects the tube 12 from excessive heating directly over the burner 15. If it is desired to use solid fuel, suitable construction may be made; and fuel box and opening may be provided on one or both sides of the furnace. This is merely utilizing ordinary structure and does not concern the invention. A baffle wall 16 is located about midway of the furnace chamber to throw the heated gases of combustion up to the higher rear portions of the tube 12; and a draft stack 17 carries off the products of combustion from the upper front part of the furnace chamber. Those parts of the furnace walls exposed most directly to the heat of the flame may be built of fire resisting material, in the manner well known to the art; and the walls may have open heat-insulating spaces 10$^a$, as illustrated. The length of chamber 11 depends upon the length of tube 12; and this, in turn, depends upon the time required to fully treat the material passing through the tube and the speed at which the material travels longitudinally in the tube. The width of chamber 11 is not very much greater than the external diameter of the tube 12, as shown in Fig. 2; and on each of the opposite sides of the chamber, horizontally opposite each other and opposite the center of the tube 12, I provide two baffle walls, or ledges 20, extending from the front wall 21 of the furnace to a point near the rear wall 22 thereof. These baffles 20 project from the side walls 23 of the furnace into close proximity to the tube 12 so that the gases of combustion are effectually prevented from passing upwardly around the forward portion of the tube 12; the baffles 20 fitting up closely to the tube without bearing against it. In consequence of this construction, the gases of combustion travel approximately in the manner indicated in the drawings, traveling rearwardly and diagonally upwardly beneath the tube 12 and then up on each side of the tube at its rear end and then forwardly to the draft stack 17. The tube 12 passes through circular openings 34 and 35 in the front and rear walls of the furnace and is carried upon circular bearing rings 36 running upon rollers 37. The rollers 37 at one end of the device may be flanged to hold the tube longitudinally in position; or any other suitable mounting or carriage for the tube may be provided. The rollers are journaled and supported upon spaced piers 41; allowing space for access to the burner 15. The rear higher end of the tube projects into a box 38 used for discharge of the volatile matter from the tube; and the front lower end of the tube projects into a discharge box 39. At the bottom of this discharge box 39 I arrange a suitable conveyer, as a spiral conveyer 40, for conveying away the treated material, which may subsequently be treated in any desired manner.

I provide means for feeding the raw material into the upper rear end of the tube; and any suitable means may be used which will substantially exclude atmospheric air from the tube 12. In my preferred form of apparatus, I use a feed hopper 45 at the rear side of box 38; this feed hopper discharging into a spiral conveyer 46 which extends through the box 38 and discharges at its end into the upper end of tube 12. The spiral conveyer, or other feeding device, is operated from shaft 47 driven by chain 48 from main shaft 49. Also I drive the tube 12 from shaft 49 through the medium of a shaft 50 and gearing 51, and a pinion 52 on shaft 50 meshing with a large gear 53 mounted upon and encircling tube 12. The ratios of the various gears are so calculated and arranged that the feeder will feed into the tube 12 just that amount of material which may be efficiently treated in tube 12; and the rotation of the tube is at a sufficient speed to cause the material to gradually move down the tube and to move completely through the tube in the time required for complete treatment. I find that, for the purposes of treating kelp in the manner specified, the temperature of the tube is not necessarily over 800°–900° F. This temperature suffices to completely char the material and to drive off the volatile matter during the passage of material through the tube. An average time period for passage through the tube may be taken as about twenty minutes. The tube is maintained at a fairly uniform temperature throughout its length, on account of the distribution of the heated gases of combustion, as hereinbefore noted. The tube is preferably of cast iron; although it may be made of boiler plate or like material. The cast iron has greater durability, is not so liable to burn, and assists in the even distribution of the heat and the keeping of a uniform temperature. All of the volatile organic matter driven off rises to the rear upper end of the tube and passes into box 38, thence passing out through a pipe 60 into a settling chamber 61 wherein the carbon and dust and other solid matter is settled out of the gases. Thence the volatile matter is led through the water seal 62. At 63 I provide an exhaust fan, or pump, or equivalent mechanism, which serves to draw the gases through the parts of the apparatus just specified, and which serves to relieve, or prevent accumulation of, gas pressure in the tube 12. This exhauster 63 forces the remaining gases into condensers 64 and 65 where the condensable gases are retained and finally forces the gases into any suitable holder at 66. The final gases may be used for fuel or other purposes; or the gases may be merely discharged into the atmosphere, in which case the exhaust fan is directly connected to 38. If the condensate from the gases is valuable, the gases will be put through condensers, as shown at 64 and 65; otherwise, the gases may be either directly rejected or used as fuel.

Having described a preferred form of my invention, I claim:

In a device of the character described, a furnace having a furnace chamber, a burner in the lower part of one end of the chamber, a rotary tube extending lengthwise through the chamber and extending slightly diagonally downwardly toward the burner end of the chamber, the burner being under the tube, the interior of the tube being non-communicative with the furnace chamber, means to rotate the tube, a draft stack leading upwardly from the upper part of the chamber above the tube at said burner end of the chamber, and baffle walls extending inwardly from the side walls of the chamber close to the opposite side walls of the tube, said baffle walls each extending from said end of the furnace to a point near its upper end, that part of the furnace chamber beneath the tube and the baffle walls forming an undivided chamber, so that the flame and heated gases from the burner travel horizontally and somewhat upwardly under the tube from the burner end of the chamber to the opposite end and then travel upwardly around both opposite sides of the tube and then travel over the tube toward its lower end to the draft stack at the burner end of the furnace chamber, and means to feed material into the upper end of the tube and withdraw it from the lower end thereof at the burner end of the furnace.

In witness that I claim the foregoing I have hereunto subscribed my name this 13th day of September, 1916.

PAUL S. SHOAFF.